April 2, 1946.  C. F. KRAMER ET AL  2,397,792
COOLING SYSTEM FOR MARINE VEHICLES
Filed Aug. 11, 1943  2 Sheets-Sheet 1

C. F. Kramer
F. G. Kerby
INVENTOR.

April 2, 1946.     C. F. KRAMER ET AL     2,397,792
COOLING SYSTEM FOR MARINE VEHICLES
Filed Aug. 11, 1943     2 Sheets-Sheet 2
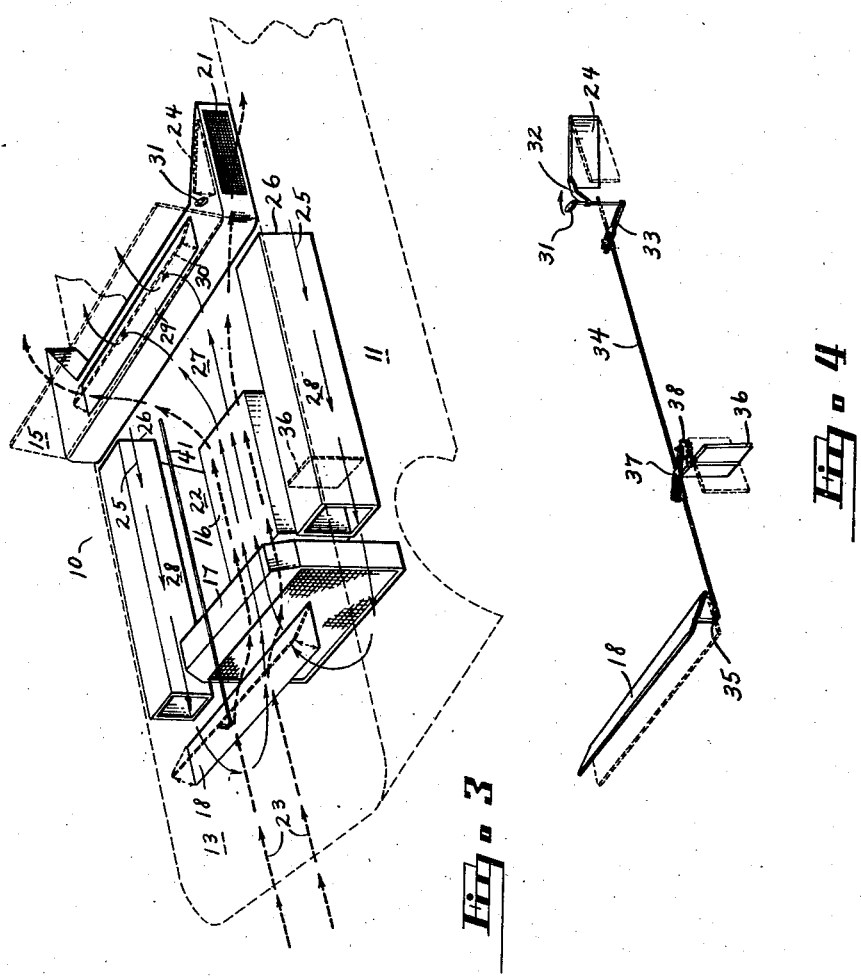
C. F. Kramer
F. G. Kerby
INVENTOR.

Patented Apr. 2, 1946

2,397,792

UNITED STATES PATENT OFFICE 2,397,792

COOLING SYSTEM FOR MARINE VEHICLES

Clarence F. Kramer, Birmingham, and Floyd G. Kerby, Detroit, Mich., assignors to Ford Motor Company, Dearborn, Mich., a corporation of Delaware Application August 11, 1943, Serial No. 498,170

8 Claims. (Cl. 115—1)

This invention relates to internal-combustion vehicles; and, more particularly, to vehicles designed for operation on either land or in water and the engine and cooling means therefor.

The specific vehicle described in this application is intended primarily as an amphibious military unit; and extended comments on its advantages or uses are hardly necessary. Many vehicles of this type have been proposed in the past and while some have been constructed, none have been entirely practicable from the standpoint of military efficiency and high production manufacture. A more complete disclosure of many of the structural features of such amphibious vehicles is to be found in copending application 471,714 of which this is a continuation-in-part.

The requirements of a vehicle of this type number, among others, seaworthiness, maneuverability and speed in either water or on land, and simplified controls when used in either medium. In this connection, the use of a liquid engine requires special consideration, for while it is apparent that the engine, during land operation, must be cooled by a conventional radiator, it may, during marine operation, be cooled by direct circulation of water as is usual in marine practice. However, such a dual cooling system is undesirable because it requires additional controls and circuits, prohibits the use of antifreeze in the radiator system and leads to an undesirable complexity of parts. On the other hand, if an air-cooled radiator is used exclusively in conjunction with the regular fluid-cooling system of the engine, transfer of the circulating coolant is avoided and the engine, as such, has precisely the same coolant flow during land or water operation. The difficulty arises in obtaining sufficient air flow to cool the radiator in both operations. During land operation, suitable ducts may be used just as in the conventional automobile and a steady and adequate supply of cooling air is insured. During marine operations, however, available entry ducts are limited by reason of seaworthiness; and, particularly in operation in heavy weather, considerable care must be taken to insure that water cannot enter through these ducts and swamp the craft.

An advantage of the present invention is that it permits the full utilization of the conventional air-cooled radiator in connection with a fluid-cooled engine under conditions of both land and marine operation. Another advantage is that it provides adequate air flow through the radiator during marine operation without subjecting the craft to danger of swamping by water entering the air ducts. Another advantage of the construction is that means are provided for separate air flows under each condition of operation, thereby insuring maximum efficiency. Yet another advantage is that the means used to effect the diverse air flows are simple and dependable in operation and the weight added to the craft—always a matter of considerable importance in designing marine equipment—is held to a minimum.

With these and other objects in view, the invention consists in the arrangement, construction and combination of the various parts of the improved device as described in the specification, claimed in the claims and illustrated in the accompanying drawings in which:

Fig. 3 is a phantom diagrammatic view showing the circulatory air paths through the cooling system.

Fig. 4 is a perspective view of an interconnecting linkage which may be employed to control the circulatory air flow.

Figure 1:
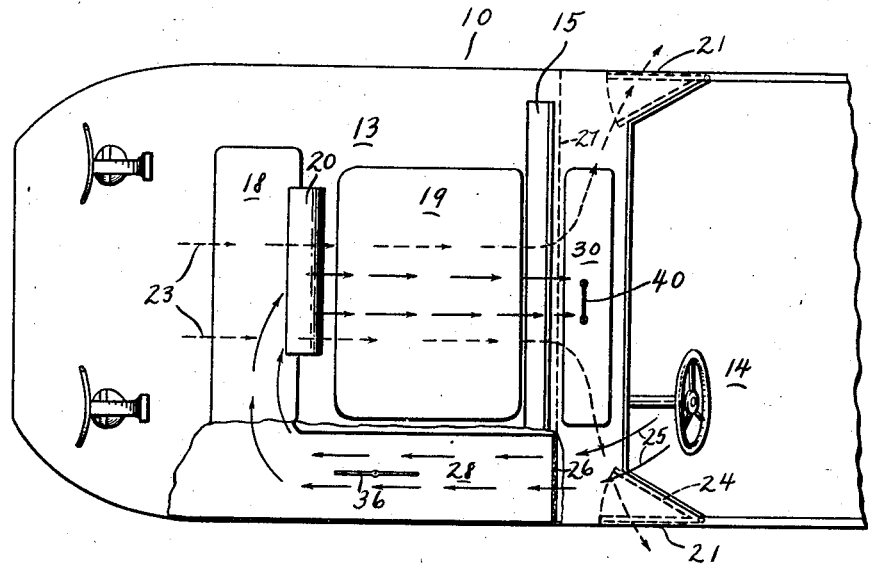
Fig. 1 is a plan view of the front portion of an amphibious vehicle, a portion of the deck being broken away to show the interior duct construction.
Figure 2:
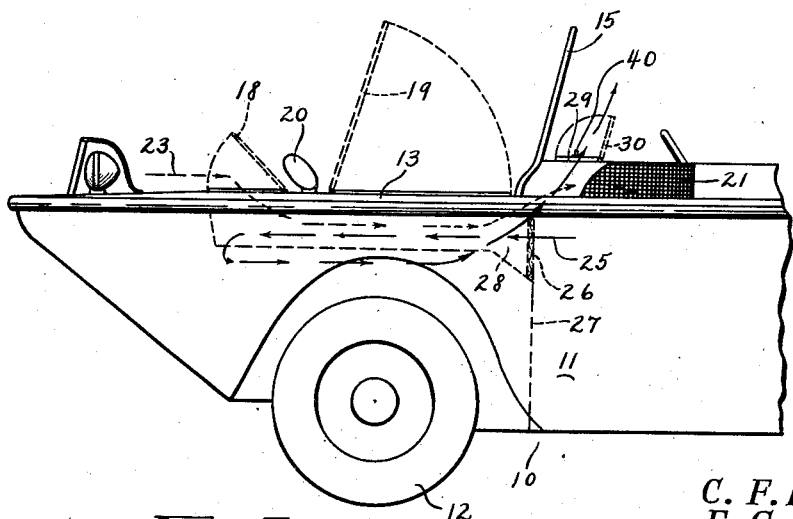
Fig. 2 is an elevation of the same portion of the vehicle.

Referring to Figs. 1 and 2, an amphibious vehicle 10 is shown having a hull 11, wheels 12 for land operation, forward deck 13, cockpit 14 and windshield 15. As seen in Fig. 3, the motor 16 is mounted in the engine chamber 22 defined by the bulkhead 27 in the forward portion of the vehicle, and has an air-cooled radiator 17 through which circulates the coolant fluid from the motor 16. Located on the forward deck 13 is the land operation cooling air intake or hatch 18, which may be opened or closed as shown, an engine access hatch 19, a muffler 20 being located intermediate the two hatches. On each side of the hull and immediately behind the windshield 15 are the land operation cooling air exhaust outlets 21 which are in direct communication through the bulkhead 27 with the engine chamber 22 in the interior of the hull 11.

In normal land operation, therefore, cooling air is admitted (as shown by the dotted arrows 23 in Figs. 1, 2 and 3) through the land operation cooling air hatch 18 opened to the position shown in dotted line in Figs. 2 and 3. It proceeds through the radiator 17 cooling the engine coolant fluid and sweeps rearwardly over the motor 16 in the engine chamber 22 and is exhausted through the land operation cooling air exhaust outlet 21. The latter has a louvre control 24 which is shown in open position in full line in Fig. 4 and in closed position in dotted line. This mode of operation corresponds broadly to that used in conventional motor car practice.

However, in marine operation, water will frequently break over the bow of the vehicle and would enter the land operation cooling air hatch 18 if it were open; and side wash might also enter through the land operation cooling air exhaust outlet 21 with consequent danger of swamping. To avoid this, the intake hatch 18 and exhaust outlet 21 are normally closed during heavy weather amphibious operation. An alternative air flow (indicated by the solid arrows 25 in Figs. 1, 2 and 3) is provided in which all exterior openings may be closed and the cooling air itself obtained from the interior of the craft. This circulation withdraws the cooling air from the cockpit 14 through an opening 26 in the engine chamber bulkhead 27 and then through ducts 28 extending forwardly on either side of the engine toward the radiator 17. This permits the cooling air to be picked up from the interior of the cockpit; and, after traversing the ducts, to be discharged in front of the radiator. It is then drawn through the radiator by the usual fan arrangement in the same manner as the cooling air taken through the land operation intake hatch when that is in use. An alternative exhaust from the engine chamber is provided through an exhaust outlet 29 having an adjustable cover 30 located just behind the windshield 15. As best shown in Fig. 2, the cover 30 is hinged rearwardly and the hot air from the engine chamber is deflected upwardly to clear the operator of the vehicle. It will thus be noted that both the intake and exhaust of cooling air during marine operation are located within the hull of the vehicle itself and hence are entirely protected from surf, spray or wash which otherwise might be admitted to the interior of the craft. Of course, the cooling capacity may be reduced to some extent when the alternative circulation is used, but since it generally need be applied only for limited periods, this is not in itself a serious drawback. It will be understood that the alternative circulation is required only when water conditions are such as to prevent the opening of the exterior hatches and the use of the normal circulation. For maximum flexibility, the cover 30, hatch 18 and louvre 24 may be operated independently as by the handle 40, bar 41 or lever 31 to obtain any desired circulatory path. Similarly, a shutter 36 may be interposed in the ducts 28 to control the air flow through them.

In some instances it may be desirable to establish a centralized control of the circulation and one such means is shown in Fig. 4 in which the single lever 31, located in easy reach of the vehicle operator, may be operated, together with the adjustable cover 30 of the exhaust outlet 29 to establish either circulation automatically. As will be seen from the drawings, the lever 31 is rotatably mounted and attached by the drag link 32 to the louvre control 24 and by a crank arm 33 to the rod 34 which runs forwardly to the land operation cooling air intake hatch 18 and to which it is attached by a link 35. Intermediate of these is a connection to the pivoted shutter 36 in the duct 28 through a slide link 37 which may include some means to multiply the amplitude of movement as, for example, the gears 38. Thus, on operation of the lever 31 from the position shown in drawings, the louvre control 24 will be closed (to the position shown in dotted line), the shutter 36 and the duct 28 will be opened to the position shown in dotted line and the land operation cooling air intake hatch 18 will be closed. It is then only necessary to open the exhaust outlet 29 to have a complete alternative circulation established for the marine operation. Similarly, the process may be reversed in which case the duct 28 is closed, land operation cooling air intake 18 and land operation cooling air exhaust 21 opened and—after the adjustable cover 30 is closed—primary circulation is established for normal land operation. Ready control is particularly important under conditions of combat and by interlocking the means which control outboard openings, there is little opportunity for one of these hatches to be left open with possible serious results from shipping of water.

The principal advantage of the present setup is that it permits the full amphibious use of an air-cooled radiator in connection with a closed circuit fluid-cooled engine. It provides for an adequate supply of cooling air through the radiator even when the craft is subjected to surf or heavy sea. Also it provides a conventional radiator and closed circuit fluid-cooled engine combination with selective alternative air circulations so that the method of cooling may be best suited to the conditions under which operations must be carried on. Another advantage is that because of the relative simplicity of the construction, there is no complicated mechanism to become deranged, the safety factor in operation is high, and the weight of the installation does not increase appreciably since the same circulating means are used for the alternative circulations.

Some changes may be made in the arrangement, construction and combination of the various parts of the improved construction without departing from the spirit of the invention and it is the intention to cover by the claims such changes as may reasonably be included within the scope thereof.

The invention claimed is:

1. In a self-propelled marine craft, an internal-combustion engine having a closed liquid-coolant system, a radiator in said coolant system, a fan for said radiator, means to direct cooling air to said radiator, said last-named means including selectively operable means to draw the cooling air from the exterior of said craft forwardly of said radiator during certain conditions of operation and from the interior of said craft aft of said radiator during other conditions of operation, the direction of flow of cooling air through said radiator remaining constant.

2. In a marine craft having an internal-combustion engine and a closed liquid-coolant system, a radiator in said coolant system, means to direct cooling air to one side of said radiator, said means including intake means to draw cooling air directly from the outside of said craft during one condition of operation and other intake means to draw cooling air from the interior of said craft during other conditions of operation, said last two means being selectively operable.

3. In a self-propelled marine vehicle having an internal-combustion engine and a closed liquid-coolant circuit, a radiator in said circuit, said radiator and engine being disposed within a chamber in the hull of said vehicle, a deck over said chamber, means on said deck to admit cooling air to said chamber forwardly of said radiator, means to exhaust said cooling air from said chamber rearwardly of said engine, forming one air circulation system, and other means forming an alternative air circulation system including means to draw air from the interior of said hull to a point forwardly of said radiator and to exhaust said air from said chamber at a point rearwardly of said engine.

4. The invention of claim 3 which is further characterized in that the exhaust means for said cooling air from said chamber under said first condition of circulation is on the side of said vehicle and the exhaust means for said cooling air from said chamber under said second condition of circulation is disposed between the sides of said vehicle.

5. The invention of claim 3 which is further characterized in that said circulation means are provided with shutters which may be selectively operated to establish one or the other of said circulations, certain of said shutters being interlocked to provide simultaneous operation thereof.

6. A marine craft having a hull, an engine chamber formed in said hull, an internal-combustion engine in said chamber having closed liquid-coolant system, a radiator in said system, means in said hull opening to said chamber forwardly of said radiator to admit cooling air thereto to establish air circulation therethrough, exhaust means communicating with said chamber and located rearwardly thereof to exhaust cooling air from said chamber, duct means leading from the interior of said hull rearwardly of said chamber through said engine chamber to a point adjacent said radiator to convey air from another portion of said hull to said radiator to establish an alternative cooling air circuit, and means to exhaust said cooling air from said alternative circuit from said engine chamber.

7. The invention of claim 6 which is further characterized in that said first exhaust means from said chamber for said cooling air is located adjacent the sides of said craft and directed outwardly therefrom.

8. The invention in claim 6 which is further characterized in that the exhaust means for said first mode of circulation are located on the side of said craft and directed outwardly therefrom, and the exhaust means for said second mode of circulation are located interiorly and between the sides of said craft and protected from the entry of water by a barrier disposed forwardly thereof.

CLARENCE F. KRAMER.
FLOYD G. KERBY.